March 22, 1932.                F. A. VOLZ                1,850,297
                            BIT OR DRILL HOLDER
                            Filed June 27, 1928
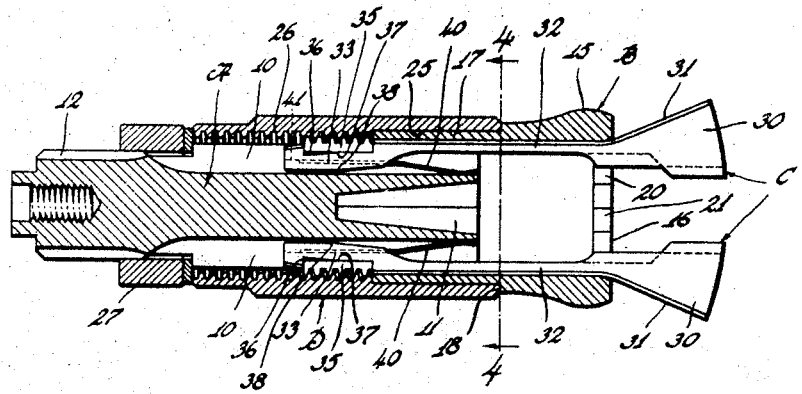
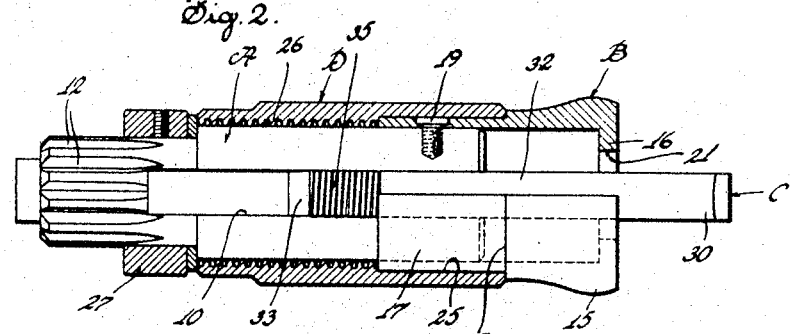
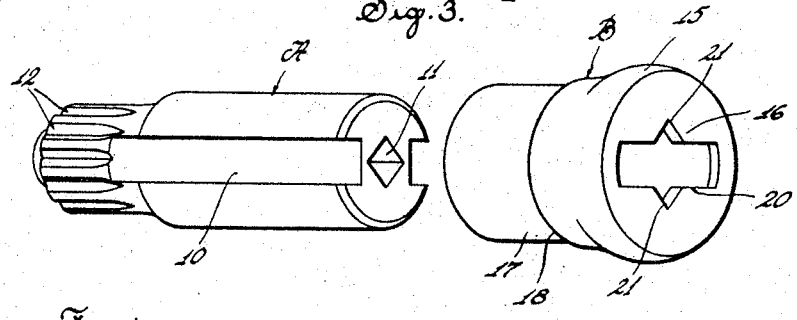
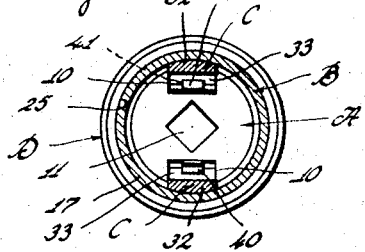
Inventor
Frederick A. Volz
By
His Attorney Patented Mar. 22, 1932

1,850,297

UNITED STATES PATENT OFFICE

FREDERICK A. VOLZ, OF NEW BRITAIN, CONNECTICUT, ASSIGNOR TO THE STANLEY WORKS, OF NEW BRITAIN, CONNECTICUT, A CORPORATION OF CONNECTICUT

BIT OR DRILL HOLDER

Application filed June 27, 1928. Serial No. 288,632.

This invention relates to holders or chucks particularly adapted for use on braces or bit stocks. The invention particularly relates to a bit holder of the type having a body portion provided with a solid square socket member for the polygonal end of the tool to be held; a pair of individual or separate jaws carried by the chuck body for longitudinal movement relative thereto, and a rotatable sleeve fixed against longitudinal movement with respect to the chuck body and having threaded relation with the jaws so that when the sleeve is turned, the jaws are moved and, when moved inwardly, the jaws are cammed towards one another so as to grip the shank of the tool to prevent it from being withdrawn from the socket.

The aim of the invention is to provide a chuck or holder of this type having various features of novelty and advantage.

More particularly, the object of the invention is to provide a chuck of this sort which is characterized by its simplicity in construction, its economy in manufacture, its strength and durability, and its effectiveness in operation.

In accordance with the present invention, the body portion of the chuck is formed of two parts, each of which may be manufactured on a screw machine so as to effect economy in manufacture and to produce an extremely strong and durable construction. A simple and economical arrangement is provided for limiting the outward movement of the jaws and for preventing the jaws from coming out when the sleeve is in place. The springs for urging the jaws apart are arranged so as to be particularly effective, and the construction is such that a substantially uniform relation is maintained between the sleeve and the threaded portions of the jaw members in all positions of the jaw members.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein is shown one embodiment which the present invention may take:

Figure 1 is a longitudinal sectional view through the chuck;

Fig. 2 is a similar view with the chuck turned 90°, the chuck body being shown in elevation;

Fig. 3 is a perspective view of the parts of the chuck body; and

Fig. 4 is a transverse sectional view taken substantially on line 4—4 of Fig. 1.

Referring to the drawing in detail, the chuck body comprises two parts, a core A and a head B. The letter C designates generally the jaw elements, and the letter D, the sleeve for controlling the jaws.

Both parts A and B of the body portion are preferably formed from pieces of steel by machining operations. Heretofore, it has been the practice to make this body portion of a single casting, a procedure which very materially added to the expense of manufacture and which did not produce an accurate and nicely finished piece. The part or core A is a generally cylindrical member having, at opposite sides, longitudinally extending grooves 10 of rectangular shape in cross section.

In the forward end of this piece A is a square socket 11 which is adapted to receive and hold against turning the polygonal end of a tool, such as a bit or drill. On the rear end of the piece A may be provided the usual gear teeth 12 which may form part of the usual ratchet mechanism. This core A is preferably constructed from a round piece of steel by turning the piece to the desired diameters, milling the grooves 10 and the grooves between the teeth 12, and drilling the square socket 11. The head B is more or less in the form of a hollow cap formed of a piece of steel. It has a hollow nose 15 closed at one end by a wall 16. Projecting from the other end of the nose is a skirt or bushing portion 17 having a shoulder 18 at its forward end. The internal diameter of the head is uniform and is such that the skirt has a drive fit on the forward end of the core A, as shown in Fig. 2, the parts being secured in assembled relation by a screw 19. The end wall 16 has a diametrically extending rectangular slot 20, the ends of which receive the jaws. The central portion of this slot is notched at opposite sides, as at 21, so as to accommodate the corners of the squared end of the tool as the latter is inserted in place. This head B is preferably formed from a piece of steel by turning the same to the external shape shown, boring out the piece to within a short distance of its end so as to leave the relatively thin wall 16, and then punching the slot 20, all of which steps may be economically carried out.

The sleeve D has, at its forward end, an unthreaded counterbored portion 25 of substantially the same length and diameter as the skirt portion 17 which it is adapted to receive. Rearwardly of the counterbored portion, the sleeve has an internal screw thread 26. This sleeve is rotatable. The sleeve is held against axial movement in the usual manner, the collar 27 being conventionally illustrated for this purpose.

Each of the jaws C has, at its forward end, a jaw portion 30, the outer edge of which is inclined, as at 31, so that when the jaws are moved inwardly, they are cammed towards each other by the engagement of the inclined surfaces 31 against the ends of the slot 20. The inner or opposed edges of the jaw portions 30 are grooved and may be stepped, as shown in Fig. 1, so as to properly grip the shank of the tool, the squared end of which is held in the tapered socket 11. Each of the jaws also has a stem portion 32, the rear end of which is provided with a foot or thickened portion 33. The feet 33 and the stems 32 are adapted to move longitudinally in the slots 10. The bottoms of the grooves 10 are, in the present illustrative disclosure, parallel throughout their lengths with the axis of the core. Each jaw member is provided with a separate screw segment or block 35 by means of which the jaws are threadedly associated with the sleeve D. Each foot 33 has a recess 36 which forms a seat for a respective screw segment 35. The bottom of the recess or seat 36 is angled so as to form a fulcrum point or line 37 midway between the ends of the block or segment 35. Also, by preference, the inner face of each foot 33 is angled; that is, it is bevelled in opposite directions from a transverse line 38 so as to leave clearances which will permit of rocking of the jaw members. It will be observed, particularly from Fig. 1, that the shoulder or end 18 of the skirt 17 forms a stop against which the forward ends of the segments 35 are adapted to engage so as to prevent the jaws from moving outwardly beyond the positions in which they are shown in Fig. 1.

The jaws are normally urged away from each other by springs 40 which are arranged in a novel and advantageous manner. The rear ends of these springs are located and secured in slots 41 on the inner faces of the feet 33. The springs extend forwardly from the feet, and the free ends of the springs ride on the bottom surfaces of the grooves 10. This arrangement is of advantage in that the springs are more effective than would be the case if they extended rearwardly from the jaw members and engaged the internal periphery of the sleeve, as has heretofore been the custom. The springs do not engage the threaded portion of the sleeve and, therefore, they do not drag thereon. Also, the bottom surfaces of the grooves 10, which, in any event, would have to be provided, constitute bearing surfaces for the springs.

It will be observed from the foregoing description, taken in connection with the accompanying drawings, that by constructing a chuck in accordance with the present invention, a very strong, simple, economical and effective device is had. The parts A and B of the body portion may be more economically manufactured. These parts may be readily assembled and present a neat and pleasing appearance. By providing separate screw segments 35, the jaws may be assembled on the body portion after the parts of the latter have been assembled. It is understood that the jaw members are inserted through the slot 20 and into the grooves 10; the segments are then positioned in the seats 36, and then the sleeve is slipped over the rear end of the body portion and turned so that the teeth of the blocks and the internal thread of the sleeve are brought into proper relation. After the parts are assembled, the inner end of the skirt portion 17 of the head constitutes a shoulder or stop against which the forward ends of the screw segments are adapted to engage when the jaws have been moved to their foremost position, thus preventing accidental displacement of the jaws and preventing the jaws from being fully withdrawn from the chuck body.

The combined thicknesses or depths of the feet 33 and the screw segments 35 are greater than the depth of the grooves 10. The screw segments, irrespective of the longitudinal positions of the jaws, always have a uniform and natural relation to the screw thread 26 of the sleeve. The jaws fulcrum, so to speak, at the point fulcrum 37 on the segments 35 without disturbing the relation of those segments with respect to the sleeve. It has been found that a chuck constructed in accordance with the present invention is extremely smooth and easy in its operation.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a chuck of the character described, a two-part body portion comprising a core and a head, said core having a socket and longitudinally extending grooves in its opposite sides, said head having a ring-like portion receiving and closely fitting about the forward end of said core; jaw members slidably mounted in said grooves and extending through and forwardly of said head, said head and jaw members having interengaging cam surfaces whereby the jaws are forced together when the jaw members are moved rearwardly; said jaw members having at their rear ends threaded portions the forward ends of which form shoulders, said shoulders being adapted to engage the rear end of said head to limit the forward movement of said jaw members, and a rotatable sleeve about said core having a thread engaging the threaded portions of said jaw members.

2. In a chuck of the character described, a body portion having a socket, longitudinally extending grooves at its opposite sides, and a slot at its forward end; separate jaw members longitudinally movable in said grooves and extending through said slot, a sleeve rotatably mounted on said body portion and having an internal thread, and removable thread blocks carried by said jaw members and engaging said internal thread.

3. In a chuck of the character described, a body portion having a socket and longitudinally extending grooves at its opposite sides, said body portion bridging the forward ends of said grooves and forming shoulders spaced rearwardly from the forward ends of the grooves; jaw members slidably mounted in said grooves and having on their rear ends thread segments with shoulders at their forward ends adapted to engage the shoulders of said body portion to limit the forward movement of the jaw members, and a sleeve about said body portion and having an internal thread cooperating with said thread segments.

4. In a chuck of the character described, a two-part body portion comprising a core and a head, said core having a socket and longitudinally extending grooves at opposite sides; said head fitting about the forward end of said core and the rear end of said head constituting a shoulder bridging said grooves, jaw members slidably mounted in said grooves and extending through said head, said jaw members having thread segments, the forward ends of which are adapted to engage said shoulder to limit the forward movement of the jaw members, and a rotatable sleeve about said body portion and having an internal thread cooperating with said thread segments.

5. In a chuck of the character described, a two-part body portion comprising a core and a head, said core having a socket and longitudinally extending grooves in its opposite sides, said head having a ring-like portion receiving and closely fitting about the forward end of said core; jaw members slidably mounted in said grooves and extending through and forwardly of said head, removable thread blocks carried by said jaw members, the forward ends of said blocks constituting shoulders adapted to engage the rear end of said head to limit the forward movement of said jaw members, and a rotatable sleeve about said body portion having a thread engaging said thread blocks.

6. In a chuck of the character described, a two-part chuck body composed of a core and a head; said core comprising a generally cylindrical member with a socket in its forward end and longitudinally extending grooves in its opposite sides leading to the forward end thereof, said head comprising a cap with a skirt portion closely receiving the forward end of said core and with an end wall provided with a slot, jaw members slidably mounted in said grooves and extending through and forwardly of said head, thread blocks removably carried by said jaw members, the forward ends of said blocks being adapted to engage the rear end of said skirt to limit the forward movement of said jaw members, and a sleeve about said body portion having a counterbore receiving said skirt and an internal thread cooperating with said thread blocks.

7. In a chuck of the character described, a body portion having a socket and longitudinally extending grooves on its opposite sides, separate jaw members mounted in said grooves for sliding and rocking movements, a sleeve about said body portion and having an internal thread, and a thread block carried by each of said jaw members and having thread segments engaging said internal thread, each jaw member and its associated thread block having opposed surfaces one of which is angled to form a fulcrum on which the jaw member may rock.

8. In a chuck of the character described, a body portion having a socket and longitudinally extending grooves on its opposite sides, separate jaw members mounted in said grooves for sliding and rocking movements and each having a seat adjacent its rear end provided with a fulcrum point, a sleeve about said body portion and having an internal thread, a thread block mounted in the seat of each jaw member and cooperating with said internal thread, and springs for urging said jaw members apart, said fulcrum point engaging against said thread block.

9. In a chuck of the character described, a chuck body having a socket and longitudinally extending grooves at opposite sides, jaw members mounted in said grooves for sliding and rocking movements, a removable thread block carried by each of said jaw members and on which said jaw members are fulcrumed, a rotatable sleeve fixed against longitudinal movement and having threaded engagement with said thread blocks, and a spring connected to the rear end of each jaw member and extending forwardly thereof, the free ends of said springs slidably engaging the bottoms of said grooves.

10. In a chuck of the character described, a two-part body portion composed of a core and a head, said core having a socket and longitudinally extending grooves at opposite sides, said head comprising a cap having a skirt closely fitting about the forward end of said core and an end wall having a slot; jaw members slidably mounted in said grooves and extending through and forwardly of said slot, removable thread blocks carried by said jaw members and on which said jaw members are fulcrumed, the forward ends of said blocks being adapted to engage the rear end of said skirt to limit the forward movement of said jaw members, a sleeve having a counterbored portion encircling said skirt and an internal thread cooperating with said thread blocks, and springs connected to and extending forwardly of the rear ends of said jaw members and engaging the bottoms of said grooves.

FREDERICK A. VOLZ.